Dec. 26, 1933.  A. Y. DODGE  1,941,134
LUBRICATING DEVICE
Filed March 25, 1932  3 Sheets-Sheet 2
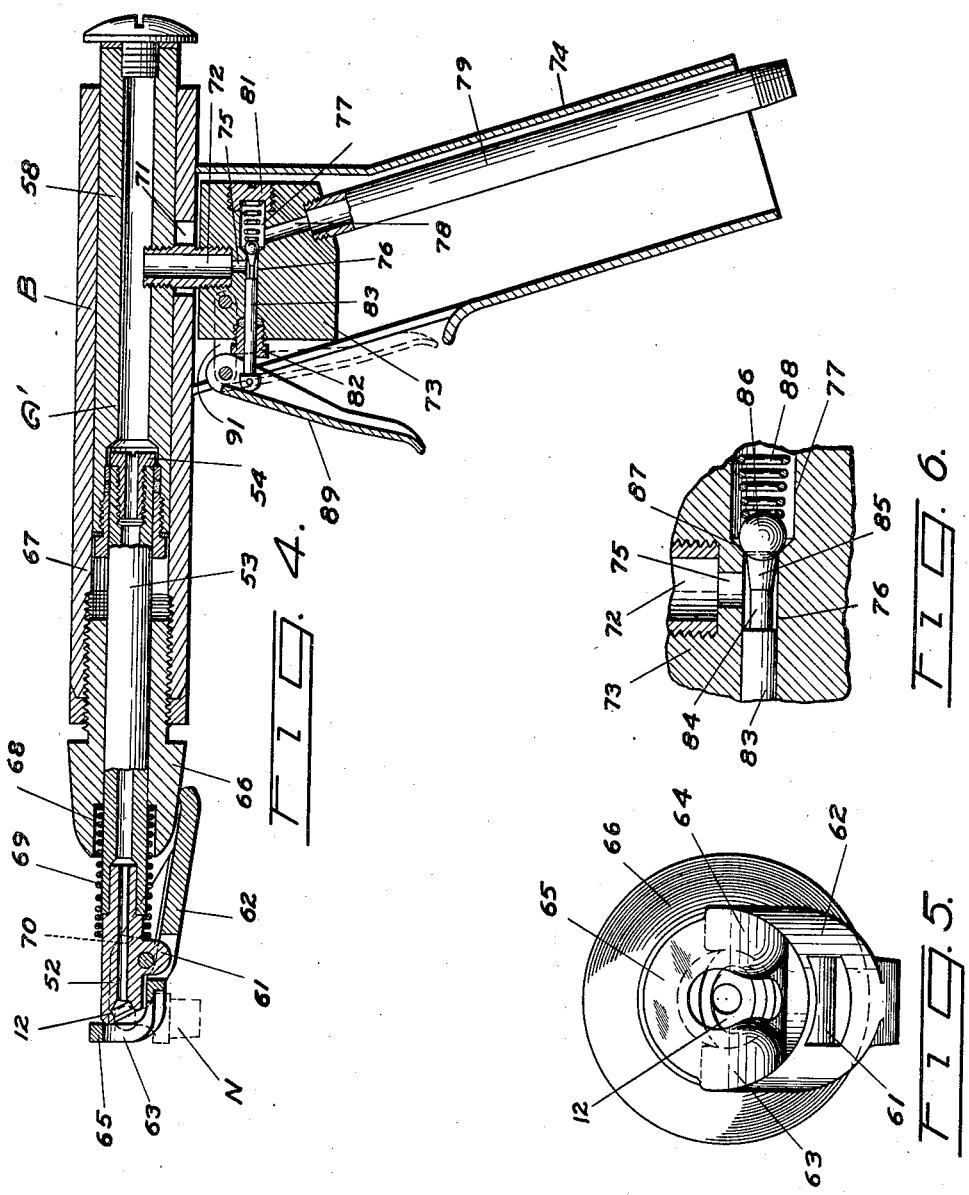
INVENTOR.
ADIEL Y. DODGE
BY
ATTORNEY.

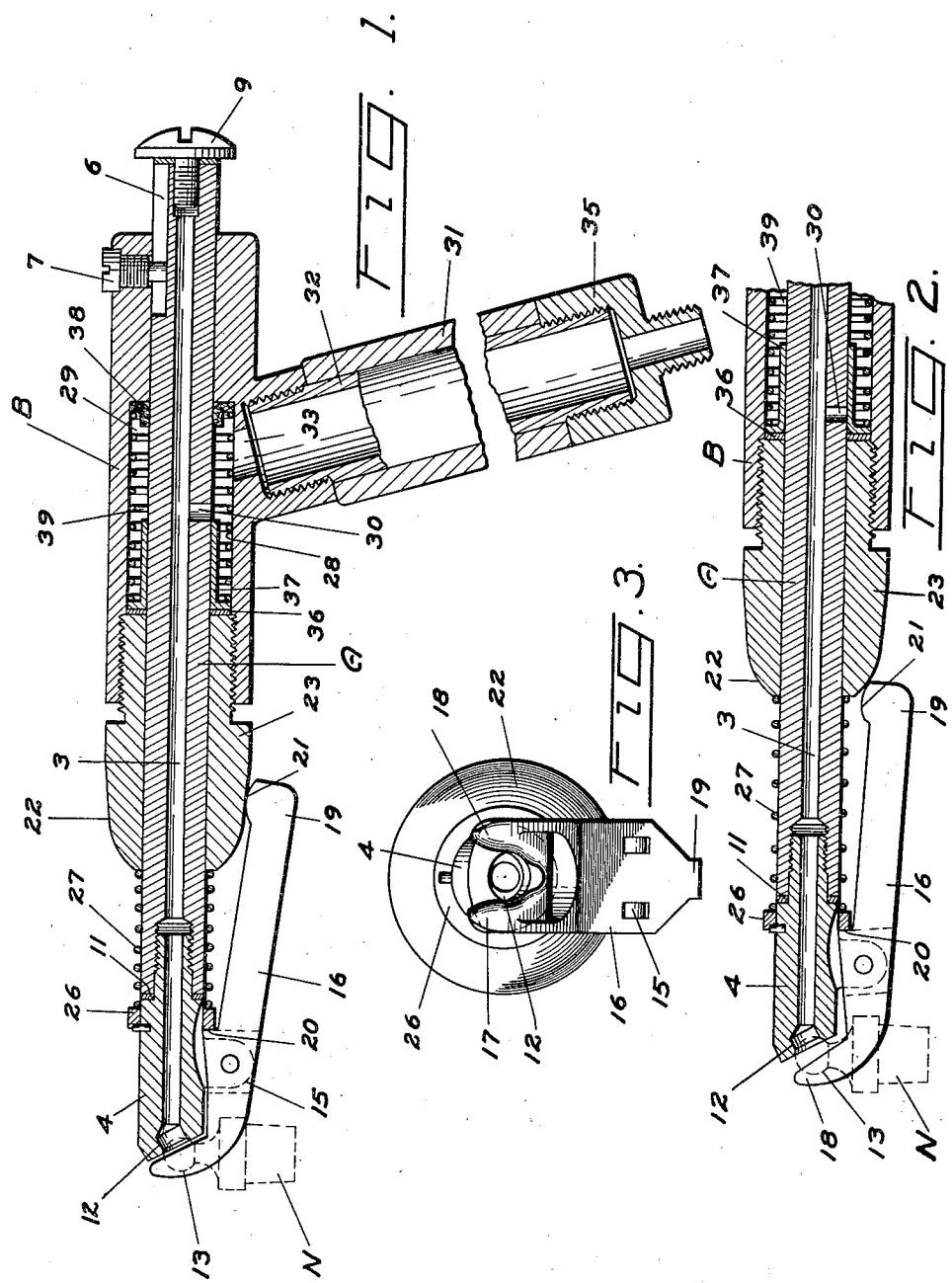

Dec. 26, 1933.  A. Y. DODGE  1,941,134
LUBRICATING DEVICE
Filed March 25, 1932  3 Sheets-Sheet 3
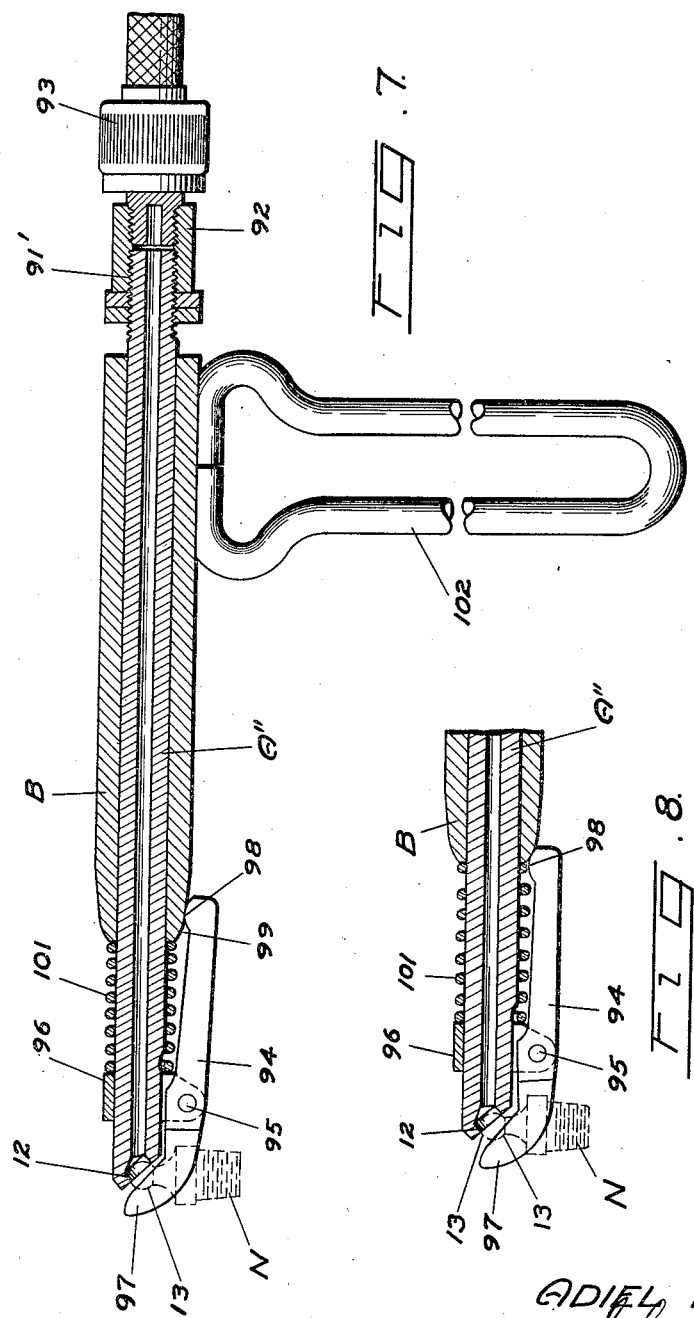
INVENTOR.
ADIEL Y. DODGE
BY John A. Watson
ATTORNEY.

Patented Dec. 26, 1933

1,941,134

UNITED STATES PATENT OFFICE 1,941,134

LUBRICATING DEVICE

Adiel Y. Dodge, South Bend, Ind., assignor to The Lubrication Corporation, South Bend, Ind., a corporation of Delaware Application March 25, 1932. Serial No. 601,127

17 Claims. (Cl. 284—17)

This invention relates to lubricating devices and more particularly to lubricant discharge nozzles incorporating means for clamping the nozzle to a lubrication nipple or fitting as during high pressure servicing.

Lubricant nozzles of the type employed for discharging lubricant under high pressure to lubrication nipples or fittings require some means for clamping the nozzle in engagement tightly with the fitting so that the nozzle will not be forced away from the fitting by the high lubricant pressure to which they are submitted.

One of the objects of the invention is to provide a clamp type lubricant nozzle which may be quickly and easily attached to and detached from a lubrication fitting which is to be serviced.

Another object is to provide a clamp type nozzle which may be engaged with and secured to a lubricant receiving fitting by a simple direct thrust toward and against the fitting, the release of the clamp from the fitting being effected by a mere pull on the clamp operating mechanism.

Another object is to provide a clamp type lubricant nozzle having a laterally extending hand grip member to facilitate manual support, wherein that portion of the nozzle containing the hand grip may be rotated at will about the axis of the nozzle so as to facilitate the introduction and use of the clamp nozzle in ordinarily inaccessible places.

Another object is to provide a lubricant discharge nozzle of the clamp type incorporating a valve mechanism for establishing flow of lubricant through the nozzle only at such times as when the nozzle is clamped in operative relationship with a lubrication nipple or fitting.

Other objects, the advantages, and uses of the invention, will be, or should become apparent after reading the following description and claims and after consideration of the accompanying drawings forming a part of this specification, in which:

Fig. 1 is a sectional view illustrating the clamp type lubricant nozzle constructed according to my invention, illustrating the nozzle engaged with the lubricant fitting;

Fig. 2 is a fragmentary view of parts illustrated in Fig. 1 shown prior to engagement with the fitting;

Fig. 3 is an enlarged front elevation of the nozzle as illustrated in Fig. 1;

Fig. 4 is a sectional view of a modified form of lubricant nozzle;

Fig. 5 is an enlarged front elevation of the nozzle illustrated in Fig. 4;

Fig. 6 is an enlarged fragmentary sectional view illustrating a detail of the nozzle in Fig. 4;

Fig. 7 is a sectional view of another modified form of lubricant nozzle, shown in engagement with a lubrication fitting; and Fig. 8 is a fragmentary view of parts of the nozzle illustrated in Fig. 7 shown prior to engagement with the fitting.

In general the nozzles selected for illustration therein comprise a conduit having one end formed to provide a discharge orifice adapted to engage with one side of the enlarged head of the lubrication nipple or fitting, a lever pivotally mounted adjacent to the outer end of the conduit and having a bifurcated jaw in register with the discharge orifice of the conduit, a barrel slidably disposed upon the conduit and provided with a cam member at its forward end for actuating the jaw upon relative right line movement between the casing and conduit. The barrel is further provided with a pistol hand grip by means of which the nozzle may be supported during the attachment and detachment to the nozzle and during the servicing operation.

Referring particularly to Figs. 1 and 2 it may be seen that there is provided a conduit generally designated A comprising a tubular rear section 3 and a tubular forward section 4. The rear section 3 is formed, adjacent to its rear end, with a slot 6. A barrel B is slidably mounted upon the conduit A and has a screw 7 extending through one side wall into the groove 6 in the outer wall of the member 3 to prevent relative rotational movement between the barrel and the conduit. The rear end of the tubular section 3 of the conduit is closed by means of a screw 9 which also serves as a stop for the barrel B. The forward section 4 forms a tubular nozzle which is screwed into the front end of the member 3. If desired, a washer 11 may be interposed between the tubular members 3 and 4 to prevent leakage of lubricant therebetween. The front end of the tubular member 4 is formed with a cylindrical pocket-like discharge orifice 12 into which the spherical head of a lubricant fitting, such as the head 13 of the fitting N, is adapted to seat while lubricant is being forced through the nozzle into the fitting.

The tubular member 4 is formed with a lug 15 upon which is pivoted a lever 16. The lever 16 has the front end bifurcated to form a pair of jaws 17 and 18, adapted to surround and contact with the spherical head 13 of the fitting.

The inside of each of these jaws is formed with a depression forming a seat for reception of a part of the spherical surface of the fitting head. The rear end 19 of the lever 16 is formed with a rounded projection 21 for coacting with the rounded cam or wedge surface 22 of a plug member 23 which in effect forms a part of the barrel B. Movement of the plug member 23 longitudinally relative to the conduit A and therefore relative to the lever 16 provides a wedging action to force the lever 16 to pivot about its axis in a clockwise direction as seen in Fig. 1 thus to clamp the spherical head 13 of the fitting N securely against the discharge orifice 12 of the conduit A. Interposed between a washer 26 on the tubular member 4, and the front end of the plug 23 is a compression spring 27 which tends normally to urge the conduit A forward relative to the barrel B and cause the parts to assume the position shown in Fig. 2.

The plug member 23 is screwed into the front end of a cylindrical recess 28 formed in the barrel B. It is formed with a central bore through which the conduit A extends. There is thus formed within the barrel B rearwardly of the plug 23, a lubricant chamber 29 through which lubricant may pass from a source of supply, a bore 30 being provided in the tubular member 3 to allow passage from the chamber 29 to the bores of the conduit sections 3 and 4.

Secured to the barrel B is a laterally extending hand grip 31 formed of a bushing 32 secured to the under side of the barrel and aligned with an inlet port 33 formed through the side wall of the barrel. The central portion of the bushing 32 is surrounded by a cylindrical cover formed of a material suitable to be gripped by the hand of the operator, and the lower end of the bushing 32 is screwed into a reduction unit 35 adapted to be fastened to a suitable supply of lubricant under pressure. The port 33 is connected with the chamber 29 of the barrel B.

The front end of the chamber 29 is provided with a washer 36 and a flanged sleeve 37 and the rear end of the chamber 29 is provided with a packing washer 38. Interposed between the flange of the sleeve 37 and the washer 38 is a compression spring 39 which thus holds the sleeve 37 and the packing washer 38 in place as shown in the chamber 29. It may be seen that when the barrel B moves forward relative to the conduit A, the sleeve 37 will cover the port 30 and prevent lubricant from passing through said port into the bore of the conduit as shown in Fig. 2.

In the operation of this form of my invention, the conduit A is normally extended forward relative to the barrel B as illustrated in Fig. 2. In this position lubricant is cut off by the automatic valve formed by the sleeve 37 and the port 30. The lever 16 is urged counterclockwise by reason of the projection 26 bearing against a boss 20 formed on the lever 16. When the nozzle approaches the fitting to be lubricated, it is pushed straight on to the fitting by the operator exerting force against the handle 31 to cause the barrel B to telescope forwardly on the conduit A and to assume the position shown in Fig. 1. Thereby the lever 16 is caused to pivot in a clockwise direction to clamp the spherical head 13 of the fitting securely against the lubricant discharge orifice 12. At the same time the sleeve 37 moves forwardly from the port 30 and lubricant under pressure may pass upward through the bushing 32, the chamber 29 and through the port 30 into the conduit. Thence it may pass forwardly into the fitting through the discharge orifice 12.

In Figs. 4, 5 and 6 I have shown a slightly different form of lubricating nozzle. Therein the conduit A' includes a forward tubular member 52 formed with a reduced rearward extension pressed into an intermediate tubular member 53, and a rearward tubular member 58 connected to the member 53 by a swivel connection 54. Thus the portions 52 and 53 of the conduit may swivel relative to the portion 58, in order that the clamping jaw of the nozzle may approach fittings at any desired angle and at the same time so that lubricant may be continuously supplied to the conduit A'.

The forward member 52 of the conduit is formed with a lug 61 upon which is pivoted a lever 62 formed with a pair of prongs 63 and 64 and with a bridge 65 interconnecting the upper ends of the prongs. The lever 62 functions as a clamping jaw in a manner similar to the lever 16 of Figs. 1 to 3.

The barrel B of the nozzle is formed by a plug 66 screwed into the front end of a cylindrical member 67. The front end of the plug 66 is formed with a recess 68 and the rear end of a spring 69 extends into the recess. The front end of the spring 69 bears upon a shoulder 70 formed on the lever 62.

The cylindrical member 67 is formed with a longitudinally extending slot 71. Secured to the member 58 of the conduit and extending through the slot 71 is a bushing 72 having its opposite end secured to a block 73 slidably mounted in a hollow hand grip 74. The block 73 is formed with a substantially vertical bore 75, aligned horizontal bores 76 and 77, and a slanting bore 78. The bores 75 and 78 intersect with the aligned bores 76 and 77 and thus form a passageway through the member 73. The bore 75 is connected with the interior of the bushing 72 and is thus connected with the bore of the conduit A'. The bore 78 is connected with a pipe 79 which may be connected with a suitable source of lubricant supply under pressure. The rear end of the bore 77 is closed by a plug 81 and the front end of the bore 76 is closed by a tubular plug 82 through which a valve stem 83 passes. Associated with the valve stem within the bores 76 and 77 is the control valve which is shown more clearly in Fig. 6. The valve comprises, in addition to the stem 83, a reduced extension 84 terminating in an outwardly tapered portion 85, the rear end of which substantially closes the bore 76. The portion 85 contacts with a ball valve 86 which is adapted to seat upon a beveled portion 87 formed between the bores 76 and 77. A compression spring 88 is provided for normally holding the ball valve 86 upon its seat the spring bearing at its rear end against the plug 81. As shown in Fig. 4, the front end of the stem 83 is pivotally connected to a trigger 89 which is pivotally mounted upon a link 91. The link 91 is pivotally mounted upon the block 73. The trigger thus slides with the block 73 and the conduit A' and it is retracted when the fitting is not clamped and is in a position in which it is inconvenient for the operator to actuate it. When the fitting is clamped, however, the trigger is moved back to the position shown in Fig. 4 and is in a position in which it is convenient to operate it.

In the operation of this nozzle the operator may grasp the handle 74 and cause the discharge orifice 12 of the conduit A' to contact with the fitting to be lubricated. Then by the exertion of force upon the handle 74, the handle together with the barrel B is pushed forward against the force of the compression spring 69, and the lever 62 is caused to swing to clamp the fitting firmly against the discharge orifice of the nozzle. Next the operator may compress the trigger 89 to move the ball valve 86 from its seat and, depending upon the degree of compression, open the valve for the passage of lubricant. It is to be understood that if the trigger is compressed all of the way back a greater space will be allowed for the passage of lubricant around the tapered element 85 than if it is only compressed slightly. Thereupon lubricant may pass from the pipe 79, through the bores 78, 77, 76 and 73 and through the bushing 72 into the bore of the conduit A'. Passing forward through the conduit it may pass into the interior of the fitting. If desired, the conduit may be rotated within the casing formed by the members 66 and 67, so that the fitting may be more conveniently approached from different angles.

In Figs. 7 and 8 I have illustrated a further modification of the discharge nozzle representing an exceedingly simple though a thoroughly practical embodiment of the invention. With reference to the drawings, the nozzle comprises a conduit A" formed of a single tubular member which may be externally threaded at its rearward end as shown at 91' for connection through a bushing 92 to a hose coupler 93 of the screw type thus lubricant may be fed from a suitable lubricant pump or dispenser directly into the conduit.

The forward end of the conduit A" is provided with a discharge orifice 12 similar in contour to that illustrated and described in connection with Figs. 1 to 6. A lever 94 is pivotally connected at 95 to an annular ring 96 secured to the conduit A" adjacent to the discharge orifice. The lever 94 is similar in most respects to the lever 16 and has a bifurcated jaw portion 97 at its forward end for engagement with the remote side of the spherical or enlarged head 13 of the fitting N, the opposite side of the head being partially received within the discharge orifice 12. The rearward end of the lever 94 has a rounded portion 98 which is arranged to contact with a cam surface 99 formed on the forward end of the barrel B whereby relative movement between the barrel and conduit may actuate the lever 94 to clamp the nozzle tightly upon the head of the fitting.

A compression spring 101 is disposed about the conduit A" between the adjacent end walls of the lever mounting ring 96 and the barrel B yieldingly to maintain the parts in the relationship illustrated in Fig. 7 wherein the nozzle is shown clamped on the fitting. A hand grip 102, which may be formed of steel wire, is secured to the barrel B adjacent to its rearward end so that the nozzle may be conveniently supported.

The nozzle illustrated in Figs. 7 and 8 is applied to the fitting N during servicing of the fitting by directing the discharge orifice 12 of the conduit A" toward and upon the head 13 of the fitting and thereafter manually forcing the barrel B forwardly on the conduit to cause the lever 94 under action of the cam 99 to engage tightly with the fitting head whereby the relatively high forces developed during the conduction of lubricant under relative high pressure to the conduit A" may be resisted and lubricant conducted through the fitting or similar parts to be lubricated.

The disengagement of the nozzle on the fitting, as in the case of the forms of the nozzles previously described, is brought about by drawing rearwardly upon the hand grip 102 to release tension of the clamping jaw by withdrawal of the cam surface 99 from the portion 98 of the lever. It may be desirable to employ a control valve of any type in connection with the nozzle shown in Figs. 7 and 8 as the nozzle herein illustrated does not include an automatic or manual control valve.

I have illustrated and described in the foregoing specification, three types of lubricant discharge nozzles wherein the nozzle may be clamped tightly in lubricant tight relationship with the nipple or fitting by directing the nozzle at and against the head of the fitting and thereafter pressing the nozzle or barrel forwardly to effect a clamping action between the clamping jaw and the discharge orifice and wherein the entire operation of the nozzle may be carried out by the use of one hand thus freeing the operator's other hand for any other duties.

The function of the nozzle is one of utmost simplicity and the angle of approach one of a widely varying range. This latter advantage is due largely to the ability of the operator to benefit by relative rotation of the conduit A" and barrel B as well as the ability of the jaw of the clamping member to engage with the head of the fitting while the conduit A" is aligned with the axis of the nipple or in angular relationship to and including an angle of 90° from the axis of the fitting.

It is to be understood that the embodiments of my invention herein set forth are presented for the purpose of illustration only, and various changes may be made without departing from the spirit of the invention and the scope of the claims.

I claim:

1. In a lubrication device for servicing a lubricant fitting, a conduit having a discharge orifice at one end, the outer walls of which are adapted for contact under thrust with said fitting, a lever pivotally mounted upon said conduit, said lever having fitting engaging portions located at diametrically opposite sides of the axis of said discharge orifice, a barrel slidably mounted upon said conduit, said barrel having a hand grip by which said lubrication device may be manually supported when in use, a cam associated with said barrel and operatively engaged with said lever to cause relative movement between the lever and the discharge orifice when thrust is applied to the barrel through said hand grip and when said conduit orifice walls are in abutment with the walls of said fitting.

2. In a lubrication device, a conduit having a discharge orifice, the outer walls of which are adapted for engagement with the walls of a lubricant receiving fitting, a clamping member associated with said conduit, said member having fitting engaging portions located at diametrically opposite sides of the axis of said discharge orifice, a barrel slidably mounted upon said conduit and provided with a pistol hand grip by means of which the device may be manually supported when in use, and a cam carried by said barrel and associated with said clamping member for causing said clamping member to engage with said lubricant fitting upon the application of thrust to said conduit in the direction of said fitting through the instrumentality of said barrel and hand grip, thereby to clamp said device upon said fitting.

3. In a lubrication device for servicing a lubricant receiving fitting having an enlarged head and provided with a lubricant port therein, a conduit formed with a discharge orifice at one end the walls of which are adapted to engage under thrust with said fitting head to provide a lubricant seal therebetween, a pivotally mounted lever associated with said conduit and formed with a clamping jaw adapted to engage with diametrically opposite sides of the enlarged head of said fitting, a cam movable relative to said conduit and operatively engageable with said lever, and a manually operable means including a hand grip, by means of which said device may be supported in the hand of an operator, for causing relative movement between said cam and said conduit to move the lever upon its pivotal mounting and to clamp the head of said fitting between the jaw and the walls of said discharge orifice when thrust is applied to the device along the axis of the conduit in the direction of said fitting through the instrumentality of said hand grip.

4. In a lubrication device for servicing a lubricant receiving fitting having an enlarged head, a conduit formed with a discharge orifice at one end, the walls of which are adapted for engagement under thrust with said fitting head to provide a lubricant seal therebetween, a lever pivotally mounted upon the conduit at the outer end thereof and provided with a jaw for engaging with diametrically opposite sides of the fitting head, a barrel slidably mounted upon the conduit and provided with a hand grip extending laterally therefrom by means of which the device may be manually supported in the hands of an operator, a cam fixed to the barrel and adapted to engage with said lever to move said lever upon its pivotal mounting and to urge said jaw towards said discharge orifice when thrust is applied to the conduit along its axis in the direction of a fitting head through the instrumentality of said hand grip, and a valve operable to admit lubricant to the conduit discharge orifice upon the functioning of said cam operated clamping lever.

5. In a lubrication device for servicing a lubricant fitting having an enlarged head formed with a lubricant port therein, a conduit provided with a discharge orifice to partially encompass the head of said fitting, a barrel slidably mounted upon said conduit, means for admitting lubricant to said barrel, a clamping jaw associated with said conduit, means associated with said barrel and operable upon relative movement between said barrel and said conduit to cause relative movement between said jaw and said discharge orifice to clamp the head of said fitting therebetween and a valve associated with said barrel and said conduit for admitting the flow of lubricant into said conduit when the barrel and conduit are in that relationship required to clamp said fitting.

6. In a lubrication device for servicing a lubricant fitting having a spherical head provided with a lubricant port therein, a conduit having a discharge orifice adapted to partially encompass the head of said fitting, a clamping jaw pivotally mounted upon said conduit and adapted to engage with the head of said fitting to clamp the fitting in engagement with said discharge orifice, a member movable with respect to said conduit for operating said clamping jaw to engage with and clamp the head of said lubricant fitting against the mouth of said discharge orifice, means for admitting lubricant to said conduit, and a manually operable valve for controlling the flow of lubricant thereto operable simultaneously with the actuation of said clamping jaw.

7. In a lubrication device, a conduit, a barrel slidably mounted on said conduit, said barrel being formed with an enlarged bore intermediate its ends to provide an annular chamber between said barrel and said conduit, said conduit having a passageway therethrough communicating with said chamber, a sleeve surrounding said conduit in position within said chamber, means for causing relative movement between said barrel and said conduit to cause the sleeve to cover and to uncover said passageway and to control the flow of lubricant from said barrel to said conduit, and means for feeding lubricant to said chamber.

8. In a lubrication device for servicing a lubricant fitting, a conduit adapted to conduct lubricant to said fitting, a clamping member associated with said conduit, a barrel slidably disposed on said conduit, cam means associated with said barrel and with said clamping member mounted for right-line movement along the axis of said conduit and responsive to relative movement of said barrel and said conduit in one direction for forcing said clamping member to move toward the outlet of said conduit, and resilient means for causing relative movement of said barrel and conduit in the opposite direction.

9. In a lubrication device for servicing a lubricant fitting, a conduit having a discharge orifice, a barrel slidably mounted on said conduit, a clamping member associated with said conduit and with said barrel, cam means mounted for right-line movement along the axis of said conduit and responsive to relative movement of said barrel and said conduit in one direction for forcing said clamping member into contact with said fitting, and resilient means for causing relative movement of said casing and said conduit in the opposite direction and for urging said clamping member away from said discharge orifice.

10. In a lubrication device for servicing a lubricant fitting, a conduit, a barrel slidably mounted on said conduit, a handle for said barrel, extending laterally therefrom, and a lubricant conduit connected with said conduit and slidable in said handle.

11. In a lubrication device for servicing a lubricant fitting, a conduit having a discharge orifice, a barrel slidably mounted on said conduit, means responsive to movement of said conduit relative to the barrel for clamping said fitting to said discharge orifice, a hollow handle for said barrel, a tubular member connected to said conduit and disposed within said handle, a valve controlling the passage of lubricant through said tubular member, and a trigger for said valve fixed to said tubular member in said handle, said barrel and handle being slidable from a position in which it is inconvenient for the operator to grasp the trigger when the fitting is unclamped to a position in which it is convenient for the operator to grasp the trigger when the fitting is clamped.

12. In a lubrication device for servicing a lubricant fitting, a conduit, a barrel having a laterally extending hand grip slidably and rotatably mounted on said conduit, said conduit having a lubricant fitting contact face formed at an angle to the axis of the bore of said conduit, a clamping member mounted on the side of said conduit responsive to barrel movement to clamp the conduit upon said fitting and means for supplying lubricant to said conduit through said barrel irrespective of the rotative position of said conduit relative to the barrel.

13. In a lubrication device for servicing a fitting, a conduit, a barrel slidably mounted on said conduit, said conduit having a portion fixed against rotative movement relative to said barrel and another portion swiveled relative to the first named portion for rotative movement in said barrel, and means including a cam associated with said barrel and said conduit for clamping a lubricant fitting to the mouth of said conduit.

14. In a lubrication device for servicing a lubricant fitting, a conduit, a barrel slidably mounted on said conduit, a handle connected to said conduit and a tubular member connected to the interior of said conduit and within said handle and slidable with the conduit relative to the handle and the barrel.

15. In a lubrication device for servicing a lubricant receiving fitting, a conduit having a discharge orifice, a clamping member mounted on one side of said conduit and having a portion adapted to be moved into engagement with a fitting when said discharge orifice is registered therewith, a barrel having a laterally extending hand grip slidably and rotatably mounted on said conduit, and means responsive to movement of said barrel longitudinally of the conduit for urging the clamping member to its clamping position.

16. In a lubrication device for servicing a lubricant receiving fitting, a conduit having a discharge orifice, a clamping member pivotally mounted on one side of said conduit and having a bifurcated jaw adapted to embrace the neck of said fitting when said discharge orifice is registered therewith, a barrel having a laterally extending hand grip slidably and rotatably mounted on said conduit, and means responsive to movement of said barrel longitudinally of the conduit for urging the clamping member to its clamping position.

17. In a lubrication device for servicing a lubricant fitting, a conduit having a discharge orifice adapted for registration with the inlet port of said lubricant fitting, a clamping jaw associated with the conduit, said jaw having a forked portion for engaging with the opposite sides of a portion of the fitting remote from the inlet, a bridge across said forked part, and means for moving said jaw and conduit relatively toward one another whereby to clamp a fitting to the conduit at said discharge orifice.

ADIEL Y. DODGE.